United States Patent [19]

Anatra

[11] Patent Number: 5,048,736
[45] Date of Patent: Sep. 17, 1991

[54] COUPON HOLDER

[75] Inventor: Victor Anatra, Guilford, Conn.

[73] Assignee: Anatra Enterprises, Inc., Guilford, Conn.

[21] Appl. No.: 544,233

[22] Filed: Jun. 26, 1990

[51] Int. Cl.$^5$ .............................................. B62B 5/00
[52] U.S. Cl. ................................. 224/277; 224/42.11; 224/42.46 R; 280/33.992
[58] Field of Search ................ 224/277, 273, 42.46 R, 224/42.11; 280/33.992; 281/45; 248/318

[56] References Cited

U.S. PATENT DOCUMENTS

| | | | |
|---|---|---|---|
| 3,409,193 | 11/1968 | Metcalf | 224/273 |
| 4,450,994 | 5/1984 | Holland | 224/277 |
| 4,512,504 | 4/1985 | Owlett | 224/42.46 R |
| 4,643,280 | 2/1987 | Hensley | 224/273 |
| 4,702,402 | 10/1987 | Ferri | 224/277 |
| 4,938,402 | 7/1990 | Anatra et al. | 224/42.46 R |

*Primary Examiner*—Linda J. Sholl
*Attorney, Agent, or Firm*—Robert H. Montgomery

[57] ABSTRACT

A coupon holder comprising a molded one piece container of substantially rigid plastic material having two spaced apart coupon receptacles joined by an upper portion adapted to be received on the handle of a shopping cart whereby the receptacles depend on either side of the handle. An adaptor or attachment member is secured to the handle and has projections or pins extending therefrom on either side thereof. The facing walls of the receptacles have vertically extending slots therein receiving the projections and enabling the coupon holder to move upwardly with respect to the cart handle. Under sufficient force, the adaptor or attachment member may also rotate on the handle as well as translate on the adaptor projections.

21 Claims, 2 Drawing Sheets

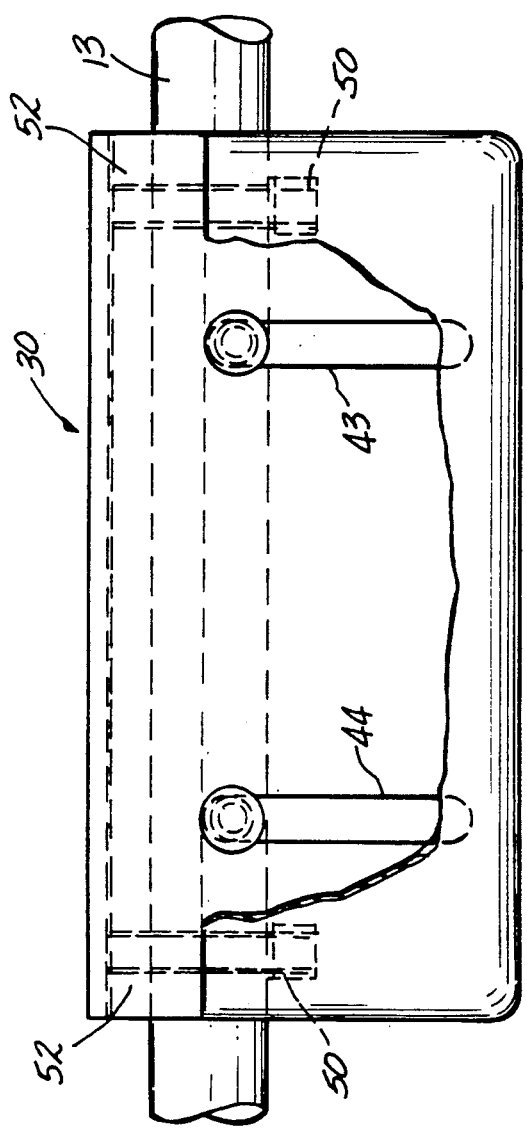
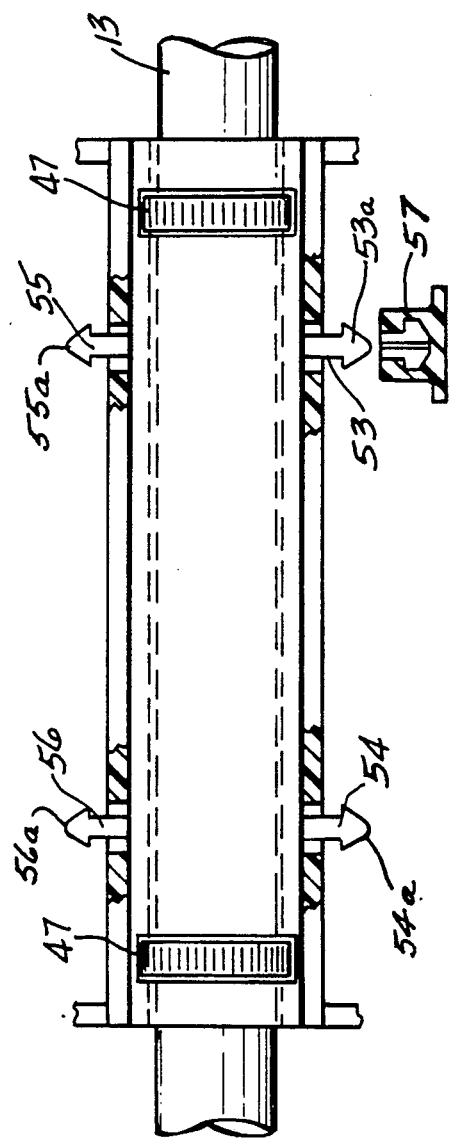
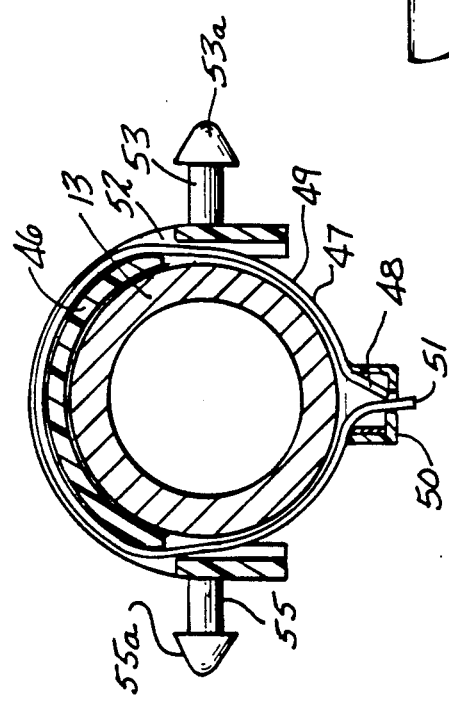

COUPON HOLDER

FIELD OF THE INVENTION

This invention relates to coupon holders adapted to be permanently attached to the pushing handle of a shopping cart.

BACKGROUND OF THE INVENTION

At the present time, it is common practice for stores, particularly supermarkets, to offer lower prices on selected articles used as promotions by the various food suppliers. These coupons may be mailed to customers directly by the food suppliers or published in newspapers particularly weekend supplements. Additionally, the discount coupons may be placed in the supermarkets.

The use of the coupons which is for promotional purposes is due to the fact that most products are now marked with what is called a bar code that is optically read at the checkout counter. Therefore, the coupons are redeemed at the checkout counter. The various retailers will have the prices of their products entered into a computer or other data processing device which will register the price of an article after the bar code is swept over the optical scanning device. For these reasons, the use of the rebate coupons have proliferated.

While the use of the coupons provides a shopper with some savings, there are limitations in the use of coupons. For example, depending upon the number and type of products for which the coupons are being used it is necessary for a shopper to handle a large number of different coupons on a given shopping trip. Different shoppers have different ways of organizing the coupons and in many cases the method of organization or lack of organization of the coupons will cause delays at the check out counter.

Various organizers or coupon holders have been proposed in the past. For example, U.S. Pat. No. 4,512,504 discloses a shopping organizer adapted to be attached to the handle of a shopping basket and includes pockets for receiving various devices such as coupons, shopping lists, calculators and other items useful for shopping.

U.S. Pat. No. 4,450,994 discloses a small filing case useful for putting in index dividers for organizing coupons. U.S. pat. no. 4,702,402 also discloses a product coupon container which is attachable to a shopping cart across the rear and upper edge bars of the basket. U.S. Pat. No. 4,643,280 discloses a portable desk and article carrying structure for use with shopping carts.

The disclosures of all of these patents have one feature of commonality and that is that the shopper must bring it with them to the store and then carry it home. Additionally, the shopper must attach it to the handle or other portions of the shopping cart.

However, to permanently attach a coupon holder to the pushing handle of a shopping cart, requires consideration in view of the nesting of the shopping carts where one shopping cart, when nested, may extend into several other shopping carts due to the hinged nature of the back panel of the carts. As is well known, the back panel of the shopping carts is hinged in such a manner when another cart is pushed into it, the back panel will swing upwardly to permit nesting.

Co-pending application Ser. No. 335,817, filed Apr. 10, 1989, now U.S. Pat. No. 4,938,402, discloses a new and improved coupon holder adapted for permanent attachment to the pushing handle of a shopping cart, and such a coupon holder which may be moved either vertically on the shopping cart pushing handle or may rotate with respect therewith to provide nesting of the carts. Tests have shown, however, that it is preferable to provide a coupon holder which will move vertically on the pushing handle of the carts when the carts are nested in storage positions.

Accordingly, the present invention provides a new and improved coupon holder which will primarily move vertically on the pushing handle of a shopping cart when the carts are nested but also has the capability under adverse circumstances to rotate on the pushing handle and move to a position which will permit nesting of the carts.

SUMMARY OF THE INVENTION

Briefly stated, a coupon holder embodying the invention comprises a molded one piece container of substantially rigid plastic material having two spaced apart coupon receptacles joined by an upper portion adapted to be received on the handle of the cart. Whereby the receptacles depend on either side of the handle. The receptacles have facing walls on either side of the handle. An adaptor or attachment member is secured to the handle and has projections or pins extending therefrom on either side thereof. The facing walls of the receptacles have vertically extending slots therein receiving the projections and enabling the coupon holder to move upwardly with respect to the cart handle. Under sufficient force, the adaptor or an attachment member may also rotate on the handle and as well as translate on the adaptor projections.

An object of this invention is to provide a new and improved coupon holder for permanent attachment to the handle of a shopping cart.

Another object of this invention is to provide a coupon holder for permanent attachment to the handle of a shopping cart which does not interfere with nesting of the carts.

A further object of this invention is to provide a new and improved coupon holder for permanent attachment to the pushing handle of a shopping cart which predominantly moves upwardly on the handle of a shopping cart, when the carts are nested but which may also rotate on the handle thereof to permit nesting of carts.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 5 is an enlarged view of a portion of FIG. 5;

FIG. 6 is a top view of the assembly shown in FIG. 4; and

FIG. 7 is a side view partially cut away of a coupon holder embodying the invention shown as mounted to the push rod of a shopping cart.

DETAILED DESCRIPTION OF PREFERRED EMBODIMENT OF THE INVENTION

Figure 4:
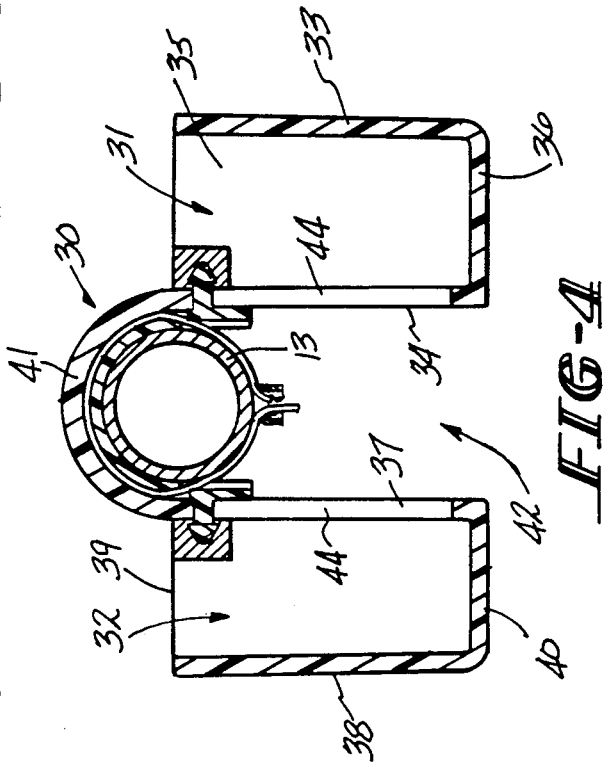
FIG. 4 is a view seen in the plane of lines 4—4 of FIG. 1.
Figure 1:
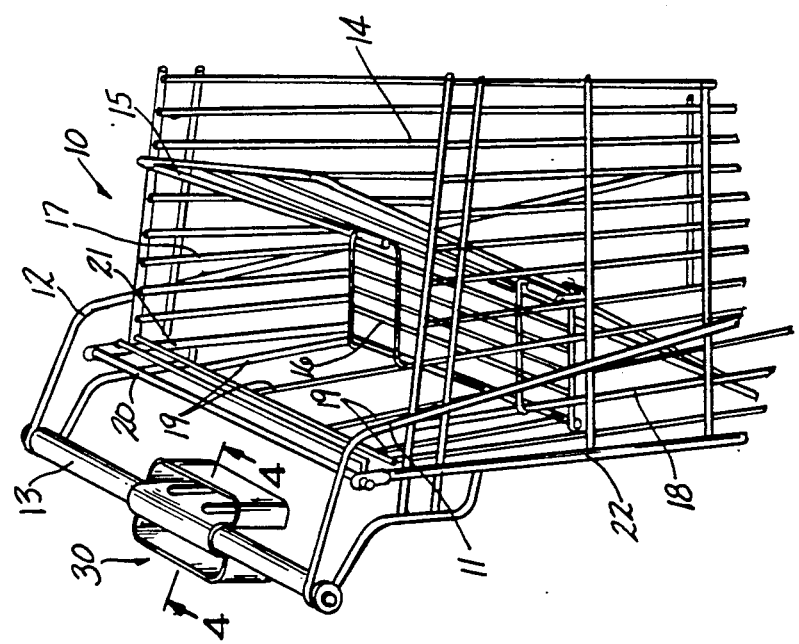
FIG. 1 is a perspective view of a portion of a typical shopping cart showing the pushing handle and a device embodying the invention amounted thereto.

FIG. 1 exemplifies a typical shopping cart 10 having side members 11 and 12 which support a handle 13. Cart has a main basket 14 and panels 15 and 16 which define a small basket or a child's seat. The cart includes a rear panel comprising rods 19 which are attached to a shaft 20 which is pivotal with respect to upright members 21 and 22. The small basket 17 may be collapsed and the rear panel 18 pivoted upwardly to nest carts for storage. A coupon holder 30 molded of a substantially rigid plastic, defines two receptacles 31 and 32 (FIG. 4). Receptacle 31 is further defined by sidewalls 33 and 34, end walls 35 and a bottom wall 36. Receptacle 32 is defined by side walls 37 and 38, end walls 39 and a bottom wall 40. A generally arcuate member 41 which is generally semi-circular in cross section joins sidewalls 34 and 37.

The facing sidewalls 34 and 37 of the two receptacles, define a channel 42 which is closed at the upper end by arcuate portion 41. Arcuate portion is somewhat flexible for reasons hereinafter made apparent. The receptacles are joined by integral arcuate portion 41 which will fit over handle 13. Reference is now also made to FIG. 7. Defined in each of facing side walls 34 and 37 are a pair of vertically elongated slots 43 and 44 for purposes hereinafter described.

Reference is now made to FIGS. 5 and 6 in conjunction with FIG. 4. FIG. 5 is an enlarged view of a portion of FIG. 4.

An adaptor member 46 is secured to handle 13 as by means of a pair of tie wraps 47. The tie wraps 47 are of a plastic material having a ratchet type configuration along the length thereof with one end 48 of a plastic strap 49 secured in a locking member 50 and the free end 51 thereof also received in locking member 50. The adaptor member 46 is partially relieved as indicated by the reference numeral 52 so that the surface of strap 47 does not extend beyond the surface of the adaptor member. The adaptor member further has projections or pins 53, 54, 55 and 56 (FIG. 6) extending horizontally therefrom, each of which receives a deformable securing nut 57 thereon for reasons hereinafter made apparent. Each of the extensions have an enlarged head denoted as 53a–56a to receive nuts 57.

While the securing means of an adaptor 46 has been shown in a rather specific form it is to be understood any suitable securing device for adaptor member 46 may be utilized.

The purpose of securing an adaptor member 46 about handle 13 is to permit rotation of the coupon holder 30 if sufficient force is applied thereto in nesting of the carts with coupon holders thereon, but to principally guide vertical movement.

The projections with the heads thereon extend through the slots 43 and 44 in the facing side walls 34 and 37 of the receptacles 31 and 32 and guide vertical movement of the coupon holder with respect to handle 13. Specifically, the coupon holder may ride up on the handle 13 to the position shown in FIG. 3 by virtue of the slots 43 and 44 moving with the pins 53 therein.

The coupon holder is secured to adaptor 46 by virtue of the deformable nuts 55 engaging the heads 53a of the pins 57.

Figure 3:
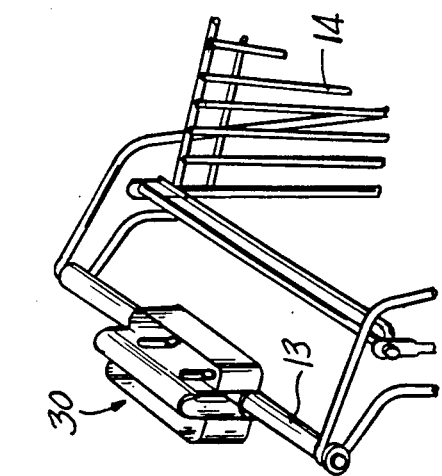
FIG. 3 is a view similar to FIG. 2 but showing the coupon holder in a vertically translated position on the pushing handle of a shopping cart.
Figure 2:
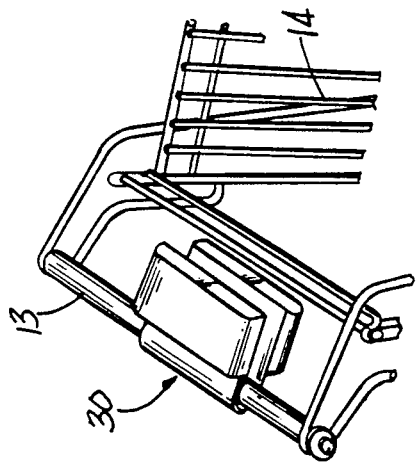
FIG. 2 is a view of a portion of a shopping cart somewhat similar to FIG. 1 and showing the coupon holder in a rotated position on the handle.

Thus the coupon holder together with adaptor 46 is designed to move vertically on handle 13 to the position shown in FIG. 3 when carts are nested.

The coupon holder by virtues of the slots 43 and 44 may ride up on pins 53 to the position shown in FIG. 3. The length of the slots determine and limit the extent of movement of the holder with respect to the handle. When the carts are unnested the coupon holder 30 will either fall down to the position shown in FIG. 1 or may easily be pushed down.

While the coupon holder is of a rigid plastic material, the arcuate portion 41 is sufficiently flexible to permit spreading of the receptacles so that the pins or projections 53–56 may be fitted into the slots 43 and 44.

It may thus be seen that the objects of the invention set forth, as well as those made apparent from the foregoing description, are efficiently attained. While a preferred embodiment of the invention has been set forth for purposes of disclosure, modification to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

What is claimed is:

1. For use with a shopping cart having a horizontal pushing handle extending rearwardly therefrom, a coupon holder molded in one piece of rigid plastic material and having two spaced apart open top receptacles joined by an upper arcuate portion adapted to be received on said handle whereby said receptacles depend on either side of said handle and having facing sidewalls on either side of said handle, and an adaptor member adapted to be fastened to said handle having projections extending from either side thereof, said facing sidewalls having vertically extending slots therein receiving said projections whereby said holder may move vertically with respect to said handle.

2. The coupon holder of claim 1 wherein said adaptor member may rotate on said handle.

3. The coupon holder of claim 1 wherein said projections receive fasteners on the ends thereof.

4. The coupon holder of claim 1 wherein said arcuate portion has flexibility to permit said projections to be inserted into said slots.

5. The coupon holder of claim 1 wherein said slots define the extent of vertical movement of said holder with respect to said handle.

6. For use with a shopping cart having a horizontal pushing handle extending rearwardly therefrom, a coupon holder molded in one piece of rigid plastic material and having two spaced apart open top receptacles joined by an upper arcuate portion adapted to be received on said handle and having facing sidewalls on either side of said handle, an adaptor member adapted to be fastened to said handle, the means defined on said adaptor member and said facing sidewalls for connecting the adaptor member and facing sidewalls together and for permitting limited substantially vertical movement of said holder with respect to said handle.

7. The coupon holder of claim 6 wherein said adaptor member may rotate on said handle.

8. The coupon holder of claim 6 wherein means on said adaptor member and said facing sidewalls comprise vertically extending slots in said sidewalls and projections on said adaptor member extending into said slots.

9. The coupon holder of claim 6 wherein said projections receive fasteners on the ends thereof.

10. The coupon holder of claim 6 wherein said arcuate portion has flexibility to permit said projections to be inserted into said slots.

11. The coupon holder of claim 8 wherein said slots define the extent of vertical movement of said holder with respect to said handle.

12. For use with a shopping cart having a horizontal pushing handle extending rearwardly therefrom, a coupon-holder molded in one piece of rigid plastic material and having two spaced apart open top receptacles joined by an upper arcuate portion adapted to be received on said handle whereby said receptacles depend on either side of said handle and have facing sidewalls on either side of the handle, and means mounted to the handle and connected to said sidewalls for securing said coupon holder to the handle while permitting translating motion of said coupon holder on said handle.

13. The holder of claim 12 where said facing sidewalls have vertically extending slots, said means mounted to said handle having projections thereon extending into said slots to guide movement of said holder with respect to the handle.

14. The holder of claim 13 wherein said means mounted to said handle comprises an adaptor member secured to the handle and rotatable about the handle.

15. For use with a shopping cart having a horizontal pushing handle extending rearwardly therefrom, a coupon holder molded in one piece of rigid plastic material and having two spaced apart open top receptacles joined by an upper arcuate portion adapted to be received on said handle whereby said receptacles depend on either side of said handle and having facing sidewalls on either side of said handle, and projections extending from either side of said handle, said facing sidewalls having vertically extending slots therein receiving said projections whereby said holder may move vertically with respect to said handle.

16. The coupon holder of claim 15 wherein said projections extend from an adaptor member mounted to said handle.

17. The coupon holder of claim 15 further including means connecting said receptacles together.

18. The coupon holder of claim 17 where said means connecting comprise fasteners received on said projections.

19. The coupon holder of claim 16 where said adaptor member may rotate on the handle.

20. The coupon holder of claim 16 further including means connecting said receptacles together.

21. The coupon holder of claim 20 where said means connecting comprise fasteners received on said projections.

* * * * *